3,081,293
Patented Mar. 12, 1963

3,081,293
REACTION OF LIGNIN AND PRODUCT
Joseph B. Doughty, Charleston, S.C., assignor to West Virginia Pulp and Paper Company, New York, N.Y., a corporation of Delaware
No Drawing. Filed Mar. 11, 1960, Ser. No. 14,185
14 Claims. (Cl. 260—124)

This invention relates to the reaction of lignin with phosphorus containing compounds and to the products obtained thereby. These novel lignin reaction products have been found to be useful as flame retardants for combustible materials such as paper and cotton cloth and in such use effectively reduce or completely prevent combustion.

Lignin occurs in nature in all woody plants in combination with cellulose. As it occurs in nature it is generally termed "proto-lignin." Very litle is known about proto-lignin since all methods used to separate the lignin from the lignocellulose materials of plants results in the chemical modification of the lignin. Numerous methods have been used for separating lignin from plants and each of these methods results in lignins having different physical and chemical characteristics. Although these lignins vary widely, most if not all lignin contain hydroxyl groups of either a phenolic and/or aliphatic nature. It is those lignins which contain hydroxyl groups which are the subject of this invention. The most widely available of these lignins which have hydroxyl groups are alkali lignins which are obtained by the pulping of wood in either the soda or kraft pulping processes. In most lignins each lignin molecule contains approximately five hydroxyl groups, although this number will vary with the source and method of isolation of the lignin. The molecular weight of lignin is generally assumed to be between 800 and 1000, but for most computations, and as is used herein, it is given a value of 840.

While lignins vary considerably as to the source from which they are derived, this variation is primarily in the number of methoxyl groups present per mole of lignin. As the methoxyl groups are unimportant for the purposes of this invention, lignins derived from any known sources, e.g. hardwoods, softwoods, straw, corn cobs, and other plant material are equally applicable in the practice of this invention.

I have found that lignin will react with certain phosphorus compounds to produce lignin phosphoric esters. Those phosphorus compounds which have been found to react are the phosphorus halides, phosphorus oxyhalides, phosphorus thiohalides, phosphorus oxides, phosphorus sulfides and derivatives of these compounds.

While the exact nature of the reactions of lignin with the above phosphorus compounds is not definitely known, they are believed to follow the equations below which have been theorized for the reaction of lignin and phosphorus trichloride. It is to be understood, however, that this invention should not be limited by the correctness of these equations.

(a) $PCl_3 + Lig(OH)_5 = \underset{(OH)_4}{Lig-OPCl_2} + HCl$

Where $Lig(OH)_5$ represents a lignin compound having five hydroxyl groups. Since the phosphorus trichloride may react with more than one lignin unit and the lignin unit may react with more than one phosphorus trichloride molecule, the reactions may also theoretically proceed as follows:

(b) $5PCl_3 + Lig(OH)_5 = Lig(OPCl_2)_5 + 5HCl$ (c) $PCl_3 + 3Lig(OH)_5 = \underset{(OH)_4}{(LigO)_3P} + 3HCl$ or (d) $2PCl_3 + 2Lig(OH)_5 = \underset{(OH)_3}{Cl_2POLigOP-OLig(OH)_4} + 3HCl$ It is easily seen that many variations of Equation $d$ may occur in which two or more lignin molecules react with two or more phosphorus chloride molecules. While it is not known whether compounds such as shown in Equation $d$ are formed during reaction there is some indication that some cross linking of the phosphorus compounds and the lignin does occur with the formation of rather large molecules. This is primarily evidenced by the solubilities of the lignin phosphorus compounds produced. The lignin phosphorus esters have been found to be insoluble in all organic solvents which normally are solvents for lignin. In fact, no solvent has been found for the lignin phosphorus esters except strong aqueous alkali solutions which give only limited solubility.

Although phosphorus trihalide has been referred to above, phosphorus pentachloride and other pentahalides and their derivatives may be used instead. When this is done two halide atoms are usually exhausted in halogenation and the other three may enter the ester reaction. For the purposes of this invention therefore the pentahalides and trihalides and their corresponding derivatives are equivalent although with the use of the pentahalides the two halogenating halide atoms result in a halogenation of the lignin prior to ester formation. The organic groups in these phosphorus halide derivatives may be either alkyl, aryl or heterocyclic groups.

When phosphorus oxychloride and derivatives thereof are used the forms of the equations will be theoretically the same as above except that PO will be substituted for P wherever it appears.

Similarly, when phosphorus thiohalides are used the forms of the equations would be modified by the substitution of PS for P.

It should be noted that in most cases not all of the chlorine atoms will be removed from the phosphorus by reaction with lignin. If these compounds are washed with water the chlorine will most likely react with the water resulting in the addition of an (OH) group on the phosphorus for each chlorine atom removed.

Lignin also reacts with phosphorus oxides and sulfides. The reaction of lignin with phosphorus pentoxide apparently proceeds through the cleavage of the P—O—P bonds yielding primary and secondary esters of the lignin. Since the reactions of the sulfides are similar to the oxides it is believed that the lignin-phosphorus pentasulfide proceeds through this same mechanism yielding similar type esters in which the oxygen has been replaced by sulfur.

The reaction of the lignin with the phosphorus compounds above may be made to proceed by merely mixing the two materials together and heating. This is not a preferred procedure, but it can be accomplished by mixing in a ball mill, a Read mixer, or other similar equipment. The reaction may also be carried out in the presence of a non-aqueous liquid as either a solvent or dispersant. The liquid may be an inert liquid which does not enter into or chemically aid the reaction, e.g. dioxane, varsol, carbon tetrachloride, or it may be a liquid such as pyridine which reacts with the hydrogen chloride evolved in the reaction. This latter material will then aid the reaction of the lignin and the phosphorus chloride by removing one of the products of reaction. The reaction mixtures may be heated, for example to the boiling point of a non-reacting liquid vehicle, to increase the reaction rate.

It is clear as shown by Equations *b* through *d* above that the amounts of lignin reacting with the various phosphorous compounds may vary. For example, one, two, or three moles of lignin (840 grams) may be caused to react with one mole of phosphorus chloride, or from one up to five moles of disubstituted phosphorus trichloride may, theoretically at least, be caused to react with each unit of lignin, as desired. It is also apparent that varying combinations of types of lignins and types of phosphorus compounds, and varying quantities of each may be used to obtain a very wide range of products.

All of the phosphorus esters of lignin are brown powders. They do not melt but sinter at vary high temperatures of 250–300° C. I have not found an organic solvent in which they will dissolve, although I have tried every solvent for lignin known to me.

Without limiting my invention, the following examples are given to illustrate my mode of procedure.

*Example 1*

One gram of alkali lignin in a free acid form obtained from kraft pulping of pine wood was dissolved in 30 ml. of dry pyridine. To the solution was added 3 ml. of phosphorous oxychloride. The addition was made dropwise and with rapid stirring. The mixture warmed up and when all of the phosphorus oxychloride had been added the temperature was 50° C. At the end of the addition all of the lignin ester appeared to have been precipitated from solution. The mixture was left standing at room temperature for three days and then filtered. The lignin ester was washed on the filter with water until all odor of pyridine was gone. The product was then air dried three days in an Abderhalden apparatus over sodium hydroxide and sulfuric acid. The dry product, a brown powder, contained 7.7% phosphorus and was insoluble in the known solvents for alkali lignin in the free acid form (a list of these solvents is contained in Technical Bulletin Number 100 "Indulin" published by the Polychemicals Division, West Virginia Pulp and Paper Company, copyright 1957). This quantity of phosphorus indicates 2.2 phosphorus groups are combined with one lignin unit of 840 g.

*Example 2*

Twenty grams of alkali lignin in the free acid form obtained from kraft pulping of pine were dissolved in 200 ml. of dry pyridine in a 500 ml. three necked ground glass flask fitted with a water cooled condenser, a mercury sealed stirrer, and a dropping pipette. Ten ml. of phosphorus oxychloride were added dropwise as the solution was stirred rapidly. As the oxychloride was added a precipitate formed and the mixture became warm. When all of the oxychloride had been added, the mixture had warmed to about 50° C. and became so viscous the stirrer stopped. To this mixture was added 110 ml. more of pyridine and a second 10 ml. batch of oxychloride. After the second addition of oxychloride the mixture was stirred for two hours and then left at room temperature over night. The lignin ester product was filtered off and washed on the filter with 100 ml. of pyridine followed by water until all pyridine odor was removed. The ester was then dried in the air for three days and in a vacuum desiccator over sodium hydroxide and sulfuric acid. This dry product contained 7.5% phosphorus. To insure the removal of all water soluble impurities the product was washed extensively with water by alternate slurrying and soaking in three 300 ml. portions of water, filtering and washing the material on the filter with one liter of water between slurrying operations. The first two slurrying operations were conducted by stirring the lignin compound in the water for about one hour and then filtering. In the last slurrying operation the compound was stirred for five minutes or more in the water and then left over night before filtering. The product was dried after these operations as described above. This washed product contained 7.7% phosphorus and it was insoluble in the usual lignin solvents (see Example 1). This quantity of phosphorus indicates 2.2 phosphorus groups are combined with one lignin unit of 840 g.

*Example 3*

Twenty grams of alkali lignin in the free acid form obtained from kraft pulping of pine wood were dissolved in 200 ml. of dry dioxane in a 500 ml. three necked ground glass flask fitted with a water cooled condenser, a mercury sealed stirrer, and a dropping pipette. This solution was heated to reflux and maintained at this temperature (105° C.) for 45 minutes. To the refluxing solution was added dropwise 15 ml. of phosphorus oxychloride. Near the end of the addition the lignin ester compound appeared to have completely precipitated and the mixture became very viscous. More dioxane, 100 ml., were added and the whole stirred well and then centrifuged remove the ester product. The material was washed by centrifuging twice with 150 ml. of dioxane and three times with 200 ml. of water. The centrifuged material was washed upon a filter paper in a Buchner funnel and further washed with about a liter of water. The product was dried in an oven for about 12 hours at 80° C. The brown powdered product contained 3.5% phosphorus. This quantity of phosphorus indicates 1.0 phosphorus group is combined with one lignin unit of 840 g.

*Example 4*

Twenty grams of alkali lignin in the free acid form obtained by kraft pulping of pine wood were dissolved in 300 ml. of dry dioxane in an apparatus as described in Example 3. The solution was kept refluxing at 105° C. over a five hour period as 20 ml. of phosphorus oxychloride were added dropwise during the refluxing period. The lignin ester was separated from the mixture by centrifuging. It was then washed by slurrying and centrifuging four times with 100 ml. of dioxane, five times with 200 ml. of water, twice with 200 ml. of methanol, and twice with 200 ml. of ethyl ether. Volatile solvents left after centrifuging were removed by air drying over night and at 50° C. over three days. The brown powdered product contained 4.6% phosphorus. This quantity of phosphorus indicates 1.3 phosphorus groups are combined with one lignin unit of 840 g.

*Example 5*

Twenty grams of alkali lignin in free acid form obtained by the kraft pulping of pine wood were dissolved in 200 ml. of dry pyridine. To this solution was added dropwise over a period of 30 minutes and with rapid stirring 20 ml. of phosphorus thiochloride. The reaction mixture was then allowed to stand for three days at room temperature. After standing the mixture was poured into 1500 ml. of ice water. The water mixture was then acidified to pH 2 to insure that all of the precipitated lignin ester would be in a filterable form. The slurry was then filtered and the lignin ester cake washed with water until the filtrate was pH 4. The filter cake of ester was then dried in an oven at 70° C. over night. The dry brown powder contained 4.6% phosphorus. This quantity of phosphorus indicates 1.3 phosphorus groups are combined with one lignin unit of 840 g.

Example 6

Twenty grams of alkali lignin in the free acid form obtained by the kraft pulping of pine wood were dissolved in 200 ml. of dry dioxane. To this solution was added 20 ml. of phosphorus thiochloride dropwise and with rapid stirring over a 30 minute period. The mixture was then refluxed for one hour and then left standing at room temperature for three days. The resulting solution was then poured into two liters of ethyl ether containing 100 ml. of water. The lignin ester was precipitated and the ether decanted off. The ester was then washed with a liter of water and the slurry filtered to remove the lignin ester. The ester was then washed on the filter with water until all odor of solvent was gone. The material was then dried in an oven at 70° C. for two days. The dry brown powder contained 1.3% phosphorus. This quantity of phosphorus indicated 0.4 phosphorus groups are combined with one lignin unit of 840 g.

Example 7

Twenty grams of alkali lignin in the free acid form obtained by kraft pulping of pine wood were dissolved in 200 ml. of dry pyridine. To this solution was added 20 ml. of phosphorus thiochloride dropwise with rapid stirring over a 30 minute period. The mixture was then refluxed at about 115° C. for one hour and then left standing at room temperature for three days. The resulting solution was then poured into two liters of cold water and the whole made acid to pH 2 with concentrated hydrochloric acid. The precipitated lignin ester was then filtered off and washed with water. The washed ester was then dried in an oven at 105° C. The brown dry product contained 4.4% phosphorus. This quantity of phosphorus indicated 1.3 phosphorus groups are combined with one lignin unit of 840 g.

Example 8

This example was conducted in a manner similar to that of Example 7 except that benzene phosphorus thiochloride was used rather than phosphorus thiochloride. The oven dry lignin ester contained 4.5% sulfur. This quantity of sulfur indicated 1.5 benzene thiophosphorus groups are combined with one lignin unit of 840 g.

Example 9

This example was conducted in a manner similar to that of Example 7 except that diethyl chlorophosphate was used rather than phosphorus thiochloride. The oven dry ester contained 3.8% phosphorus. This quantity of phosphorus indicates 1.2 diethyl phosphate groups are combined with one lignin unit of 840 g.

Example 10

This example was conducted in a manner similar to that of Example 7 except that phosphorus trichloride was used rather than phosphorus thiochloride. This oven dry product contained 4.7% phosphorus. This quantity of phosphorus indicated about 1.5 phosphorus groups are combined with one lignin unit of 840 g.

Example 11

This example was conducted in a manner similar to that of Example 7 except that the lignin used was an alkali lignin made from soda cooks of hardwoods. The oven dry ester contained 3.6% phosphorus. This quantity of phosphorus indicates that 1.2 phosphorus groups are combined with one lignin unit of 840 g.

Example 12

This example was conducted in a manner similar to that of Example 7 except that the lignin used was an alkali lignin made from a semi-kraft cook of spruce and other softwoods. This oven dry ester contained 4.7% phosphorus. This quantity of phosphorus indicated the ester contains 1.5 phosphorus groups for each lignin unit of 840 g.

Example 13

A mixture of 75 g. of alkali lignin in the free acid form and 25 g. of phosphorus pentoxide was ground in a one quart ball mill for two hours. The mixture was then heated in a porcelain dish over a two hour period with stirring up to 200° C. The heated mixture was then cooled to near 100° C. and then added with stirring to a liter of water. The water-lignin slurry was left standing over night and then filtered. The lignin cake was washed on the filter with 1500 ml. of water to remove any unreacted phosphorus compounds and then dried to constant weight of 105° C. The product was analyzed for phosphorus content and was found to contain 3.3 to 3.2% phosphorus, indicating that one phosphorus group had reacted with a lignin unit of 840 g.

Example 14

A further reaction was conducted the same as Example 13, except that phosphorus pentasulfide was used instead of phosphorus pentoxide. The product was analyzed for phosphorus content and found to contain 4.3 to 4.5% phosphorus, indicating that one phosphorus group had reacted with a lignin unit of 840 g.

Example 15

8.4 grams of alkali lignin in the free acid form obtained by kraft pulping of pine wood were dissolved in 100 grams of molten urea at 135° C. To this mixture 6.3 grams of urea phosphate were added during which frothing occurred. After the urea phosphate had been added the mixture was heated at 130–140° C. for an hour. The hot fluid mixture was then poured into a liter of water at a pH of 1.0. The mixture was filtered and the filter cake washed with a liter of distilled water. The resultant cake was dried at 105° C. over night and a total of 7.4 grams of product was obetained which contained 6.2% phosphorus, indicating approximately 2.0 phosphorus groups were added to each lignin unit of 840 grams.

The yields obtained in the above examples were generally very good. In Examples 1–7 and 10–12 yields of over 95% were obtained.

The lignin phosphorus esters prepared in the above examples have been found to provide a substantial degree of flame resistance to cellulosic materials. Strips of cotton fabric and filter paper which had been dipped in aqueous slurries of the lignin phosphorus esters and dried would not support continuous combustion when tested according to the procedures of ASTM D–626–55T and ASTM D635–44 for determining flammability. The rate of burning of the lignin phosphorus esters treated material was also found during these tests to be less than half the rate of burning for material treated in like manner with unreacted lignin.

I claim:
1. Lignin phosphorus esters.
2. Lignin phosphorus compounds prepared by the reaction of lignin and a phosphorus compound selected from the group consisting of phosphorus trihalides, phosphorus oxyhalides, phosphorus thiohalides, phosphorus oxides, phosphorus sulfides and organic derivatives thereof.
3. Lignin phosphorus compounds prepared by the reaction of lignin and a phosphorus trichloride.
4. Lignin phosphorus compounds prepared by reacting lignin and a phosphorus oxyhalide.
5. Lignin phosphorus compounds prepared by reacting lignin with a phosphorus thiohalide.
6. Lignin phosphorus compounds prepared by reacting lignin and a phosphorus pentoxide.

7. Lignin phosphorus compounds prepared by reacting lignin and a phosphorus pentasulfide.

8. The method of preparing lignin phosphorus compounds which comprises reacting lignin with a phosphorus compound selected from the class consisting of phosphorus trihalides, phosphorus oxyhalides, phosphorus thiohalides, phosphorus oxides, phosphorus sulfides and organic derivatives thereof at a temperature between ambient temperature and approximately 200° C. for 10 min. to 72 hours.

9. The method of claim 8 wherein the reaction is carried out in a nonaqueous mutual solvent for the lignin and the phosphorus compound, said solvent being reactive with hydrogen chloride.

10. The method of claim 8 wherein the phosphorus compound is a phosphorus trichloride.

11. The method of claim 8 wherein the phosphorus compound is a phosphorus oxyhalide.

12. The method of claim 8 wherein the phosphorus compound is a phosphorus thiohalide.

13. The method of claim 8 wherein the phosphorus compound is phosphorus pentoxide.

14. The method of claim 8 wherein the phosphorus compound is phosphorus pentasulfide.

References Cited in the file of this patent

UNITED STATES PATENTS

| Number | Name | Date |
|---|---|---|
| 2,368,660 | Hochstetter | Feb. 6, 1945 |
| 2,378,715 | Leatherman | June 19, 1945 |
| 2,385,586 | Rudy et al. | Sept. 25, 1945 |
| 2,486,419 | Katzen | Nov. 1, 1949 |
| 2,536,988 | Vartanian | Jan. 2, 1951 |
| 2,985,643 | Boomer et al. | May 23, 1961 |

OTHER REFERENCES

Kosolapoff: Organo Phosphorus Compounds, pages 222–223 (1950 edition), John Wiley & Sons, New York, N.Y.

Brauns: Chemistry of Lignin, page 325 (1952 edition), Academic Press, Inc., New York, N.Y.